(12) United States Patent
Chen et al.

(10) Patent No.: US 7,518,662 B2
(45) Date of Patent: Apr. 14, 2009

(54) CONTRAST ENHANCEMENT FOR LIQUID CRYSTAL BASED PROJECTION SYSTEMS

(75) Inventors: Jianmin Chen, Superior, CO (US); Michael G. Robinson, Boulder, CO (US)

(73) Assignee: Real D, Beverly Hills, CA (US)

( * ) Notice: Subject to any disclaimer, the term of this patent is extended or adjusted under 35 U.S.C. 154(b) by 241 days.

(21) Appl. No.: 11/464,093

(22) Filed: Aug. 11, 2006

(65) Prior Publication Data

US 2006/0285042 A1    Dec. 21, 2006

Related U.S. Application Data (63) Continuation-in-part of application No. 10/908,671, filed on May 22, 2005, now Pat. No. 7,345,723.

(60) Provisional application No. 60/595,882, filed on Aug. 12, 2005.

(51) Int. Cl.
    *G02F 1/1335*  (2006.01)
(52) U.S. Cl. .............................. 349/5; 349/117; 349/96
(58) Field of Classification Search ........................ None
    See application file for complete search history.

(56) References Cited

U.S. PATENT DOCUMENTS

| | | | |
|---|---|---|---|
| 4,792,850 A | 12/1988 | Lipton et al. | |
| 6,362,862 B1 | 3/2002 | Itoh et al. | |
| 6,552,767 B1 | 4/2003 | Kaneko | |
| 6,603,523 B2 | 8/2003 | Nakamura et al. | |
| 6,624,862 B1 * | 9/2003 | Hayashi et al. | 349/119 |
| 6,626,539 B2 | 9/2003 | Van Gelder et al. | |
| 6,636,276 B1 | 10/2003 | Rosenbluth | |
| 6,667,784 B2 | 12/2003 | Sharp et al. | |
| 6,714,350 B2 * | 3/2004 | Silverstein et al. | 359/486 |
| 6,721,096 B2 | 4/2004 | Bruzzone et al. | |
| 6,805,445 B2 | 10/2004 | Silverstein et al. | |
| 7,261,421 B2 * | 8/2007 | Yoshikawa et al. | 353/31 |
| 7,289,177 B2 * | 10/2007 | Shimizu | 349/117 |
| 2003/0128320 A1 | 7/2003 | Mi et al. | |
| 2004/0218124 A1 | 11/2004 | Mi et al. | |
| 2005/0168662 A1 * | 8/2005 | Nakagawa | 349/5 |
| 2005/0264734 A1 | 12/2005 | Robinson et al. | |
| 2006/0092380 A1 | 5/2006 | Salsman et al. | |

FOREIGN PATENT DOCUMENTS

WO    2005116738    12/2005

OTHER PUBLICATIONS

International Search Report for co-pending PCT Application PCT/IB05/51683, mailed Mar. 23, 2006.

(Continued)

*Primary Examiner*—Richard H Kim
(74) *Attorney, Agent, or Firm*—Baker & McKenzie LLP (57) ABSTRACT

Described are tilted compensators for compensating for in-plate and out-of-plane retardances of LC panels in their dark states, including a single tilted biaxial retarder or compound retarder comprising more than one biaxial film, which are effective to compensate both for nonideal polarization effects of LC panels and other optical components in optical projection systems. Also described are tilted compensators for deflecting away from a projection system optical path unwanted reflected light.

25 Claims, 5 Drawing Sheets

OTHER PUBLICATIONS

International search report and written opinion of the international search authority in co-pending PCT application No. PCT/US08/07603 filed Jun. 17, 2008.

International search report and written opinion in corresponding PCT/US06/31456 mailed May 20, 2008.

* cited by examiner

CONTRAST ENHANCEMENT FOR LIQUID CRYSTAL BASED PROJECTION SYSTEMS

CROSS-REFERENCE TO RELATED APPLICATIONS

This application is a continuation-in-part of U.S. patent application Ser. No. 10/908,671, filed May 22, 2005, which is hereby incorporated by reference. This application also claims priority to U.S. provisional patent app. No. 60/595,882, filed Aug. 12, 2005, which is hereby incorporated by reference.

TECHNICAL FIELD

Disclosed embodiments herein generally relate to optical devices for use in liquid crystal (LC) display systems, and more in particular to reflective liquid crystal on silicon (LCoS) projection architectures using compensators to enhance contrast. The compensators are configured to compensate for residual in-plane and out-of-plane retardation present in the OFF-state of an LC panel and also to compensate for non-ideal optical effects present in other optical components.

BACKGROUND

Liquid crystal display based front and rear projection systems show great potential for High Definition (HD) and three dimensional video applications due to their superior resolution. Contrast is considered an important performance specification of a projection system, as it ultimately influences the number of true gray levels and the color fidelity. A challenge in such projection systems is to achieve acceptable system contrast despite subtle depolarization effects within the optical modulation system.

In projection displays using LCoS or other LC panels, there is a need to compensate residual, OFF-state panel retardance to ensure sufficient contrast performance, because such residual in-plane retardance applied to incident optical rays can cause polarization mixing and lead to OFF-state leakage. In the case of large screen televisions based on LC panel projection, this leakage manifests itself as a bright dark-state and one that is often colored. When displaying dark video content, such leakage is very obvious and undesirable. Removing residual OFF-state retardance of the LC panels, or at least its adverse affect, can be achieved by introducing birefringent elements in front of the panel, which was described by U.S. Patent Publication No. US 2003/0128320, to Xiang-Dong Mi, and by M. Robinson in commonly-assigned U.S. patent application Ser. No. 10/908,671.

In general, compensators act first to remove residual in-plane OFF-state retardance of the panel, and second to reduce OFF-state light leakage due to the out-of-plane retardance which relates to field-of-view (FOV) performance of the LC layer. Removing the in-plane retardance is important since it corresponds to the extent to which the LC molecules are not aligned normal to the substrate or not balanced in their orientations when projected onto the panel plane. The substantial out-of-plane retardance alters the polarization state of off-axis rays, and acts to reduce the panel's field-of-view and in non-collimated systems leads again to OFF-state leakage. To get the high contrast demanded of current commercial video projection systems, both in-plane and out-of-plane compensation is desired.

SUMMARY

Disclosed herein are compensation schemes for an LC panel where the projected indices of the LC panel are compensated by the in-plane and out-of-plane retardance components of a compensator with a tilted optical axis. The compensator may also compensate for imperfections of various other optical components in a projection system, including wire-grid, multilayer birefringent cube PBSs, form birefringent PBSs, or MacNeille PBSs.

In an embodiment, an optical projection system is provided for projecting modulated light from an LC panel along a light path. The projection system includes an LC panel and a compensator. The LC panel is positioned in the light path, and the LC panel is substantially planar and operable to receive polarized input light on an illumination portion of the light path. The LC panel is further operable to modulate the input light to form a modulated light that travels along a modulated light portion of the light path, thus imparting a first polarization upon certain portions of the input light, and imparting a second polarization upon other portions of the input light. A substantially planar compensator is positioned along the light path. The compensator has an optic axis tilted relative to the plane of the LC panel.

BRIEF DESCRIPTION OF THE DRAWINGS

For a more complete understanding of the principles disclosed herein, and the advantages thereof, reference is now made to the following descriptions taken in conjunction with the accompanying drawings in which.

DETAILED DESCRIPTION

Disclosed herein is a system, apparatus, and method that compensates for LC birefringence, birefringence from PBS, and interface reflections, and significantly improves system contrast over conventional techniques.

Figure 1:
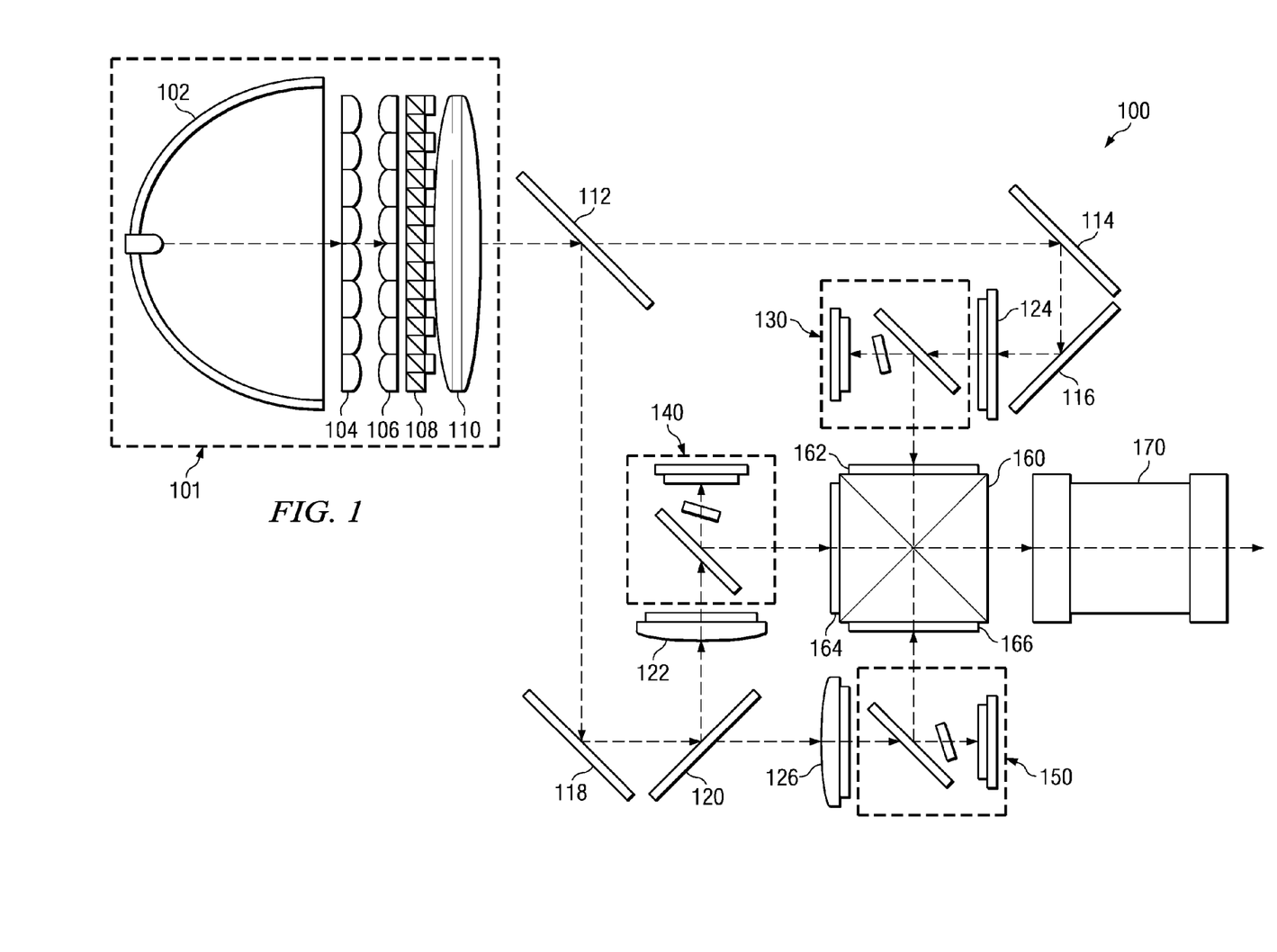
FIG. 1 is a schematic diagram of an exemplary optical three-panel LCoS projection system using a wire grid polarization beam splitter in accordance with the present disclosure.

FIG. 1 is a schematic diagram of an exemplary optical three-panel LCoS projection system 100. Projection system 100 may include an illumination subsystem 101, which may distribute light to the modulation subsystems 130, 140, 150 via beam splitters 112, 120, and mirrors 114, 116, 118, arranged as shown. Beam splitters 112 and 120 split light into two beams of differing wavelength (color), that selectively reflect or transmit light depending on the light's wavelength. Beam splitters 112 and 120 may be dichroic beam splitters, such as dichroic mirrors or prisms. Projection system 100 may further include projection lens 170 for outputting modulated light, typically to a screen for viewing an image. Modulation subsystems 130, 140, and 150 are adapted to modulate blue, green, and red wavelength portions of the visual light spectrum respectively. A more detailed description of modulation subsystems 130, 140, 150 is provided with reference to FIG. 1A below.

Illumination subsystem 101 may include a light source 102, lens arrays 104, 106, polarization beam splitter (PBS) array 108, and combining lens 110. Illumination subsystem 101 provides homogenized, telecentric polarized illumination to the modulation subsystems 130, 140, 150. As will be appreciated by a person of ordinary skill in the art, various illumination subsystems and variations thereof may be used to provide these functions and others, for example, illumination subsystems shown and described in MICHAEL G. ROBINSON ET AL., POLARIZATION ENGINEERING FOR LCD PROJECTION 37-41 (John Wiley & Sons, Ltd 2005), which is hereby incorporated by reference for all purposes [hereinafter referred to as POLARIZATION ENGINEERING].

Figure 1A:
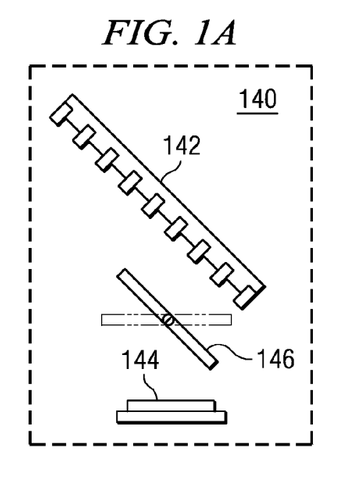
FIG. 1A is a schematic diagram of an exemplary subsystem that may be used with the three-panel LCoS projection system of FIG. 1.

FIG. 1A is a schematic diagram of an exemplary modulation subsystem 140 that may be used with the three-panel LCoS projection system 100 of FIG. 1. Modulation subsystem 140 includes a wire grid PBS (WGP) 142, a modulating panel 144, and a biaxial compensator 146. Although modulation subsystem 140 is illustrated, which modulates green light, this description also applies to modulation subsystems 130 and 150, which are of substantially similar structure and function, except they are adapted to modulate blue and red light respectively. For instance, modulation subsystem 130 (for blue light) includes a WGP 132, a modulating panel 134, and a biaxial compensator 136. Similarly, modulation subsystem 150 (for red light) includes a WGP 152, a modulating panel 154, and a biaxial compensator 156. It should be appreciated that each modulation subsystem may comprise components having variations in optical characteristics to optimize the performance of each respective subsystem for a particular wavelength, or range of wavelengths.

In operation, referring back to FIG. 1, the light from the projection lamp 102 is transmitted through a fly's eye lens array (104-106) and PBS array 108 to homogenize the light, and a series of dichroic mirrors 112, 120 is used to separate incoming white light from the projection lamp 102 into red, green, and blue components. Absorption polarizers 122, 124, 126, may be used at each stage (for each color) to polarize the incoming light so at each modulation subsystem 130, 140, 150, the light can be modulated and reflected by the ensuing modulating panel 134, 144, 154, and wire-grid polarizer 132, 142, 152, respectively. As mentioned, both the modulating panel (e.g., 134, 144, 154) and wire-grid polarizers (e.g., 132, 142, 152) for each modulation subsystem 130, 140, 150, respectively, may introduce nonideal polarization effects, such as skew-ray or off-axis polarization effects. Accordingly, a biaxial compensator 136, 146, 156, can be positioned at one or more of the modulation subsystems 130, 140, 150, in order to compensate for these nonideal polarization effects.

Affecting system contrast is the reflection of light off the compensator and panel. For instance, light passing though the compensator 136, 146, 156 and back without encountering the LC will exhibit mixed polarization and contribute to off-state leakage. Although reducing interface reflection (e.g., by using anti-reflective coatings on the compensator component) can reduce this effect, negating it altogether is not practical. The proposed compensation techniques include tilting the compensators 136, 146, 156 to reduce this effect, thereby improving system contrast. Unwanted reflected light off the proposed tilted compensator/air interfaces would be at a bias angle away from the system's optic axis, thereby desirably minimizing its capture and projection onto the display screen. It may also be of benefit to tilt the compensator to accommodate for subtle polarization effects emanating from the wire grid polarizing beam spitter that act to reduce system contrast.

Thus, tilting one or more of compensators 136, 146, 156 relative to the plane of the respective modulating panel 134, 144, 154 provides improvements to system contrast. In general, the biaxial compensators 136, 146, 156 (or compound compensating films having the same polarization effect) within the system, may be oriented about, and may be tilted with respect to, the projection system's 100 optic axis, specifically including tilting them relative to the plane of the respective modulating panels 134, 144, 154 and relative to the usual 45-degree orientation of the PBS surface. Although tilted plates adjacent to LCoS or other LC panels can reduce image quality through astigmatic aberration, an embodiment employs a compensating element of less than 0.5 mm to allow reasonable tilting (e.g., approximately 5 degrees, or less than about 5 degrees, or less than about 10 degrees) of up to ten degrees without significant image defocus (<0.5 pixel). In cases where any astigmatic aberration is unacceptable, a planar compensator with a tilted optic axis may be used such as a biaxial material sandwiched between oppositely wedged glass substrates. Although this does not reduce the surface reflection contribution to the contrast, it does act to further compensate the WGP 132, 142, 152. An exemplary embodiment of such a compensator component 800 is illustrated later with reference to FIGS. 8A and 8B.

Referring back to FIG. 1, in a similar manner, biaxial materials whose optic axes are tilted with respect to their surfaces could alternatively be used to compensate WGPs. Such materials could include sheared plastic film or obliquely evaporated dichroic-based retardation plates.

Each modulating panel 134, 144, 154 is operable to modulate light by imparting a first polarization state upon certain portions of the light (e.g., in an ON-state), and imparting a second polarization state upon other portions of the light (e.g., in an OFF-state). The modulated light from each modulation subsystem 130, 140, 150 then passes through clean-up polarizers 162, 164, 166, respectively, prior to being recombined by dichroic x-cube 160, and being directed to a screen by projector lens 170.

More detail regarding the compensators 136, 146, 156 is provided below.

Figure 2:
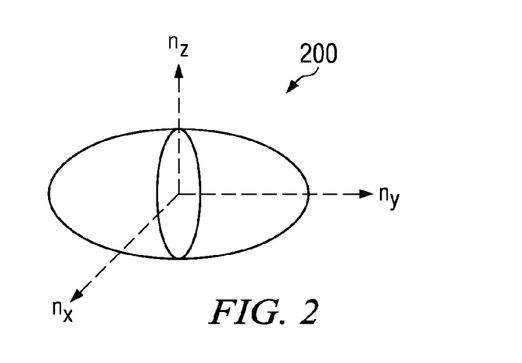
FIG. 2 is a schematic perspective representation of the birefringence of a retardation film as an index ellipsoid.

FIG. 2 is a three dimensional schematic representation of the birefringence of a retardation film as an index ellipsoid 200. One or more retardation films may be combined to make a compensator, such as compensator 136, 146, or 156 of FIG. 1. Any retardation film can be characterized uniquely by three refractive indexes $n_x$, $n_y$ and $n_z$, where $n_x$, $n_y$ and $n_z$ are defined for orthogonal polarization axes. A representation of the three axes is shown by the index ellipsoid 200. It is known that with simple one-dimensional stretching, substantially uniaxial birefringence is formed with associated optical properties. In certain special cases, for instance positive uniaxial stretched films, two of the indexes are substantially equal (e.g., $n_x > n_y = n_z$) and components formed from these materials are termed a-plates if the x-axis is in the plane of the material. Liquid crystal molecules in LCoS panels are positive uniaxial with their x-axis (optic axis) parallel to the molecular alignment direction. Negative c-plates are uniaxial with $n_x = n_y > n_z$, where the z-axis is normal to the plane of the component.

More recently, manufacturers have developed two-dimensional stretching of polycarbonate (PC). Such retarders may be appropriate to address LCD contrast and FOV enhancement requirements. The more complex 2D stretching, which includes shearing, can form layers that exhibit biaxiality. By controlling the extent of biaxiality, improvements in off-axis performance can be achieved. The extent to which off-axis performance is improved can be readily calculated for varying degrees of biaxiality in a viewing plane containing two of the film's three orthogonal optic axes ($n_x$, $n_z$). The optical properties of a biaxial film can be characterized by the $N_z$ factor, where $N_z = (n_x - n_z)/(n_x - n_y)$. As described in chapter three of POLARIZATION ENGINEERING, it can be proven that the retardation in this particular incidence plane is independent to first order in angle when $N_z = 0.5$.

Figure 3:
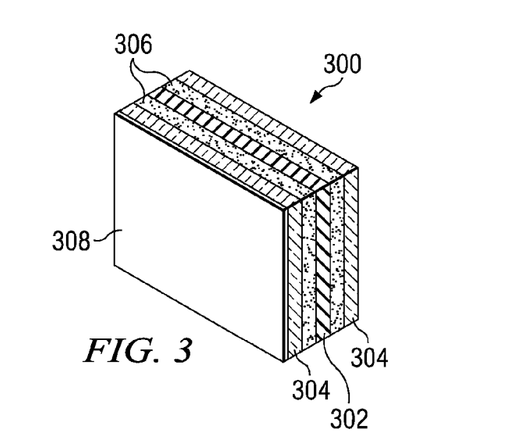
FIG. 3 is a schematic perspective diagram illustrating an exemplary compensator component in accordance with the present disclosure.

FIG. 3 is a schematic diagram illustrating a possible construction of the elements of an exemplary compensator component 300. Stretched polymer retarders are typically manufactured by coating resin on a metal casting belt. As such, the optical properties (e.g., transmitted wavefront distortion) of a polymer retarder can adversely affect the image quality when incorporated into a projection system. One solution is to mount the polymer film 302 between optically flat substrates 304 (such as glass) using a conforming, index matched optical adhesive 306. An anti-reflective coating 308 may be provided on the optically flat substrates 304. Film casting is followed by stretching. The stretching is accomplished in a continuous fashion via an accurately controlled oven with a pair of rollers turning at different rotation speeds. The precision of this process determines the spatial statistics of the retarder film, including retardation and optic axis. Stretched polymer retarders are low-cost birefringent elements that can be manufactured with large apertures, good cosmetic quality, high durability, and with varying, prescribed retardances.

It should be appreciated that a single birefringent layer can be approximated by compound structures comprising combinations of retarder films. For example, a combination of an a- and c-plate can, properly designed, yield for certain performance characteristics substantially the same performance as a single biaxial film. Thus, in this application, the terms "compensator" or "biaxial compensator" includes single or compound retarders performing in this way. Furthermore, it should be appreciated that the compensators described herein may, in other embodiments, be made from any equivalent suitable material such as solid crystals, liquid crystal polymers, or another material exhibiting optical properties in which the $R_O$ and $R_{th}$ values of the compensator's retardance (defined below) can be configured consistent with the teachings of the present application. The liquid crystal polymer can have dual homogeneous alignment, splay alignment (homogeneous/homeotropic) or any suitable alignment.

Figure 4:
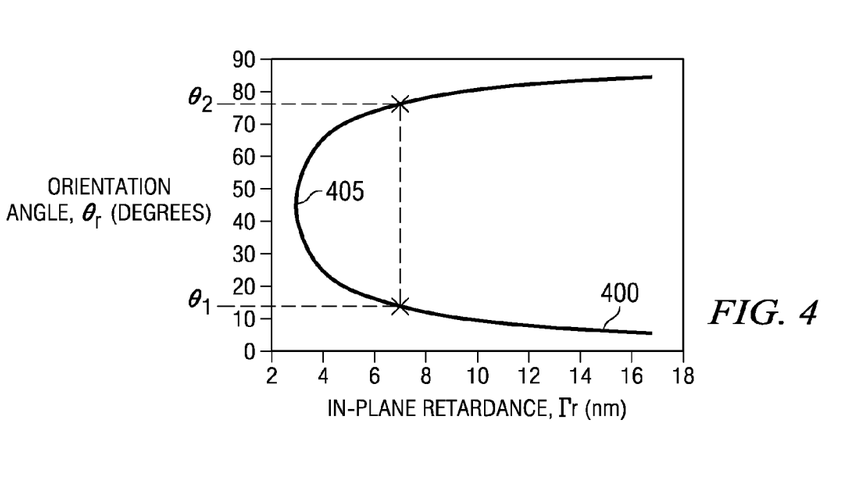
FIG. 4 is a graph showing an exemplary relationship of compensator orientation as a function of in-plane retardance for an LC display panel in accordance with the present disclosure.

The present application discloses various embodiments of compensators for an LC panel where the projected indices of the LC panel are compensated by the in-plane retardance component ($R_O$) and out-of-plane retardance component ($R_{th}$) of the film using a biaxial compensator. Referring back to FIG. 2, for a single biaxial compensator (retarder), there are two important parameters, $R_O$ and $R_{th}$. They are defined as follows:

$$R_O = (n_x - n_y)d$$

$$R_{th} = ((n_x + n_y)/2 - n_z)d \qquad (1)$$

where d is the thickness of the retarder film. $R_O$ is used to compensate the head-on residual birefringence of the panel while $R_{th}$ is used to compensate its out-of-plane component affecting FOV. As was the case in the commonly-assigned application, U.S. patent application Ser. No. 10/908,671, the solution of the compensator orientation and its $R_O$ value follows a C-curve, which is shown in this application as FIG. 4.

In an embodiment, an advantageous approach is to use a biaxial compensator that has an $R_{th}$ value near in magnitude to the total retardance of the modulating panel ($=\Delta n \cdot d$ where $\Delta n$ is the difference of the LC ordinary and extraordinary indices and d is its thickness) but having opposite sign. A value of $R_O$ is chosen to be greater than 10 nm more than the residual of the panel such that its x-axis is close (<10°) to the input polarization direction. Referring back to FIG. 1A, in an embodiment, the compensator (e.g., 136, 146, 156) may then be rotated by ~5° about an axis parallel to the wire grid metal stripes such that the compensator is at an angle of about 40° relative to the PBS plate 142. As mentioned, however, the five-degree rotation is merely exemplary and other advantageous compensator plate tilting can be employed according to system design needs, including tilted about axes other than that defined by the wire grid stripes.

FIG. 4 is a graph showing an exemplary relationship of compensator orientation as a function of in-plane retardance for an LC display panel. More specifically, FIG. 4 illustrates a resulting 'C' curve 400 of optimal compensator orientation (y-axis) as a function of its in-plane retardance (x-axis) when the residual retardance of an LC panel is 3 nm at an input wavelength of 550 nm (i.e., at point 405). The solution equation from which this C-curve is generated is set forth and described in commonly-assigned U.S. patent application Ser. No. 10/908,671, which is incorporated by reference, and provides definition and application of that formula in the LC compensating context.

For each value of compensator retardance, there are two orientations ($\theta_1$, $\theta_2$) at which the residual in-plane retardance is compensated, where the orientations are related by $\theta_1 = 90° - \theta_2$. $\Gamma_r$ is the in-plane retardance of the compensator ($=R_O$ for a biaxial compensator), and $\Gamma_p$ is the residual in-plane retardance of the panel. Thus, for a given $\Gamma_r$ (where $\Gamma_r > \Gamma_p$), there are two possible compensator orientations given in FIG. 4. In the specific illustration of FIG. 4, the in-plane retardance is shown as an example at $\Gamma_r \cong 7$ nm, which yields $\theta_1 \cong 15°$ and $\theta_2 \cong 75°$, and given the relatively flat slope of the C-curve 400 in this region, the solution would be relatively impervious to variations in the in-plane retardance values of the compensator 146 ($\Gamma_r$) and/or LC panel 144 of FIG. 1A ($\Gamma_p$). The flatter part of the C-curve exists in some of the described embodiments for $\Gamma_r - \Gamma_p >$ approximately 15 nm.

In some embodiments, applicants have recognized the advantage in choosing a compensator with an in-plane retardance value $\Gamma_r$ that is mismatched, at least to a certain degree, from that of the LC panel $\Gamma_p$ in its OFF-state. In particular, because of the steep slope of the C-curve near the 45° solution 205, where $\theta_1 \cong \theta_2 45°$, small variations in compensator or panel retardance in the 45° implementation can cause relatively dramatic shifts in the orientation solutions according to the illustrated C-curve of FIG. 4. For example, according to the graph, if in-plane retardance of the compensator shifts from 3 nm to approximately 3.2 nm, a shift in retardance of only approximately 7%, the proper orientation angle shifts approximately a full 10°, from 45° to 55°. Without adjusting the system to compensate for this shift in retardance, there could be a dramatic shift in system performance.

Moving away from the 45° solution 405 to other portions of the illustrated C-curve 400 provides better systemic tolerance of variations of retardance values, $\Gamma_r$ and $\Gamma_p$, thereby improving the manufacturability of the optical systems in which the disclosed compensators are employed. An exemplary solution range would be in those solutions on the C-curve where the orientation angle $\theta_1$ is less than approximately 20° and the orientation angle $\theta_1$ is greater than approximately 70° (e.g., in those areas where the C-curve 200 is flattening out). A wider-angle range would be where the orientation angle $\theta_1$ is less than approximately 30° and the orientation angle $\theta_1$ is greater than approximately 60°. The solutions closer to the 45° solution 405 have the disadvantage of requiring tighter tolerance on the in-plane retardance values in order to maintain the same the optical system components near their optimal orientations.

The above description provides solutions whereby the in-plane residual retardance of a panel $\Gamma_p$ can be compensated in a reflective LC projection system by an optical component that has an in-plane retardance equal to, or greater than $\Gamma_r$. Although in-plane compensation only may yield sufficient system performance, a more complete solution includes simultaneous out-of-plane panel compensation. Some embodiments of this patent disclosure therefore may include creating a compensating component that has one or more birefringent layers that has an in-plane retardance value greater than that of the panel and properties that can offer some (or indeed complete) out-of-plane compensation. The orientation parameter(s) and tilt component can then be selected in accordance with the above teachings to ensure good in-plane compensation.

Figure 7:
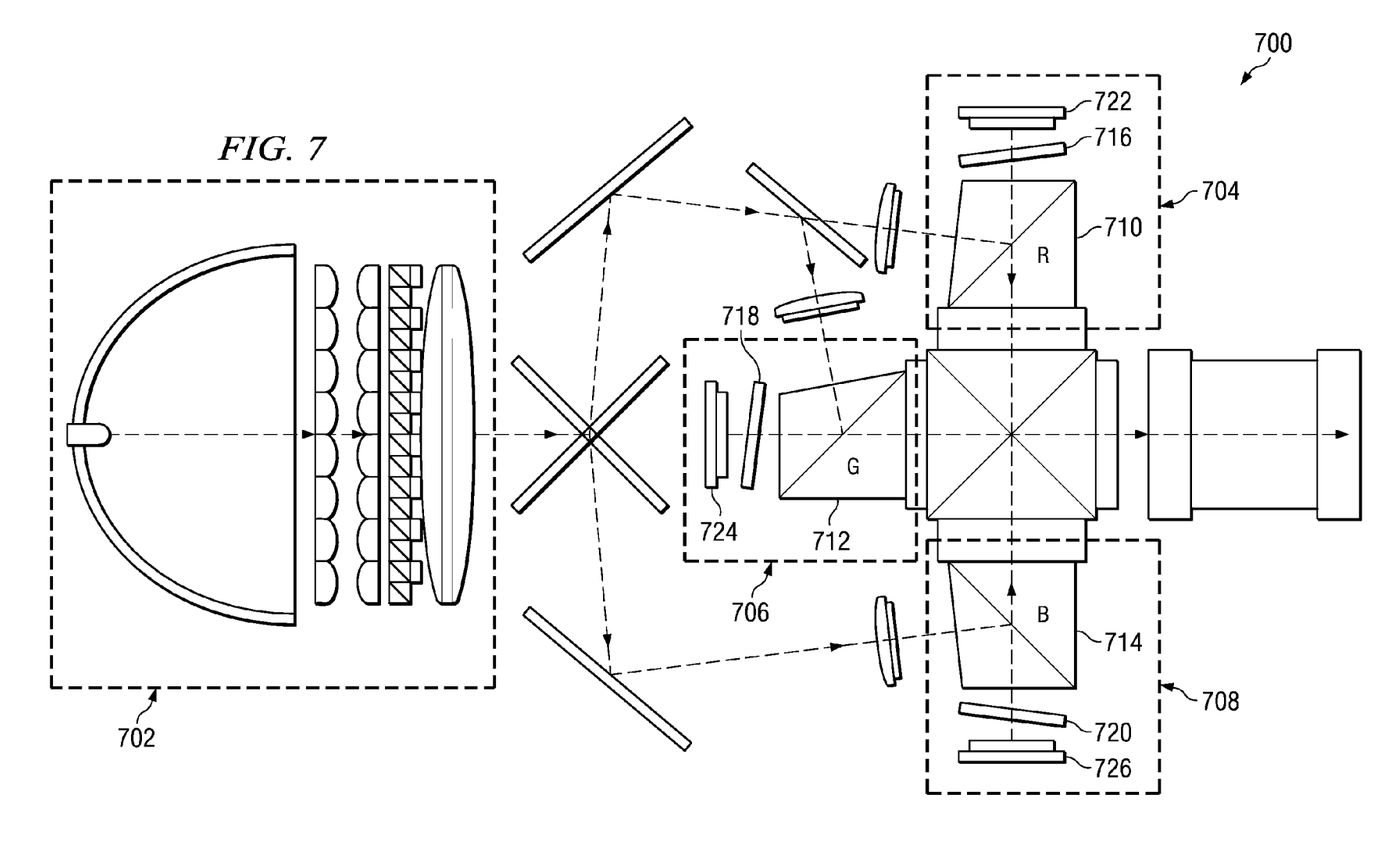
FIG. 7 is a schematic diagram of an exemplary optical three-panel LCoS projection system using polarization beam splitter cubes in accordance with the present disclosure.

In addition to compensating for the LC panel, the compensators described in this application may also be used to compensate for other components in an optical projection system, and in particular may be used to compensate for birefringent effects induced by other optical components, including wire grid, MacNeille, form birefringent (e.g., Vikuiti™ PBS manufactured by 3M, Inc.) or other types of polarizing beam splitters. [An illustration of an exemplary projection system with a cube PBS is shown later with reference to FIG. 7]. A wire-grid PBS plate, for example, is an important component found in many optical projection systems, and in particular in many LCoS projection systems, and the compensators disclosed by this application may be used to compensate for nonideal polarization effects introduced by these types of component, as well.

For instance, the overall optimum compensation solution for system contrast in an exemplary optical projection system 100 should also take into account imperfections in polarization handling of this beam splitting component. The plate PBS is a tilted wire-grid polarizer, and in effect can be thought of as a periodic ordering of one-dimensional metal gratings, ideally with a pitch <1/10 of the shortest illuminating wavelength.

Figure 5:
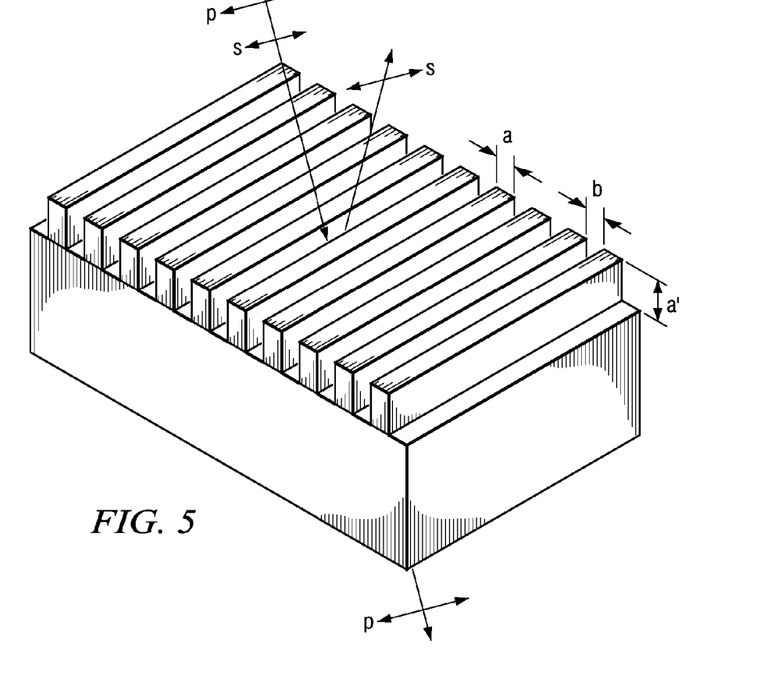
FIG. 5 is a schematic diagram illustrating the structure of an exemplary wire grid polarizing beam splitter in accordance with the present disclosure.

The performance of a high aspect ratio (a'/a>>1) wire grid PBS can be modeled as a form-birefringence element comprising alternate metal/air layers normal to the substrate. In an embodiment, assuming an aluminum wire grid structure of the type shown in FIG. 5, with a 50% fill factor (a=b) and a pitch much smaller than visible light wavelengths (<<0.5 μm), the following uniaxial refractive indexes can be derived:

$$n_o^0 = \sqrt{\frac{n_{air}^2 + n_{Al}^2}{2}} = 0.696 + 4.71i \text{ and} \quad (2)$$

$$n_e^0 = \frac{\sqrt{2}\, n_{air} n_{Al}}{\sqrt{n_{air}^2 + n_{Al}^2}} = 1.43 + 0.0045i$$

taking the refractive index of the aluminum, $n_{Al}$ to be 0.974+6.73 i at λ=550 nm.

The large imaginary index of the ordinary ray (o-mode) (polarized in the plane of the substrate and parallel to the metal stripes), produces severe attenuation in transmission and high reflectivity at boundaries. On the other hand, the e-mode (with electric field perpendicular to metal stripes) experiences minimal attenuation and reflectivity. Hence theoretically, the structure acts as an e-type polarizer in transmission and an o-type in reflection. In the more practical case, however, a'/a~1, making the structure resemble more closely a cylindrical wire grid, which from symmetry would be an o-type polarizer in transmission with its optic axis along the wires.

More detailed measurement of the wire grid PBS shows that its description in terms of a simple o-type polarizer is not entirely adequate. As further described in POLARIZATION ENGINEERING, p. 99, direct measurements indicate significant induced ellipticity of skew-ray polarization in transmission consistent with small biaxiality. Thus, to further optimize system contrast, it is desirable to also compensate for the ellipticity of skew-ray polarization of the wire-grid PBS, and the presently disclosed compensation schemes address this.

Figure 6:
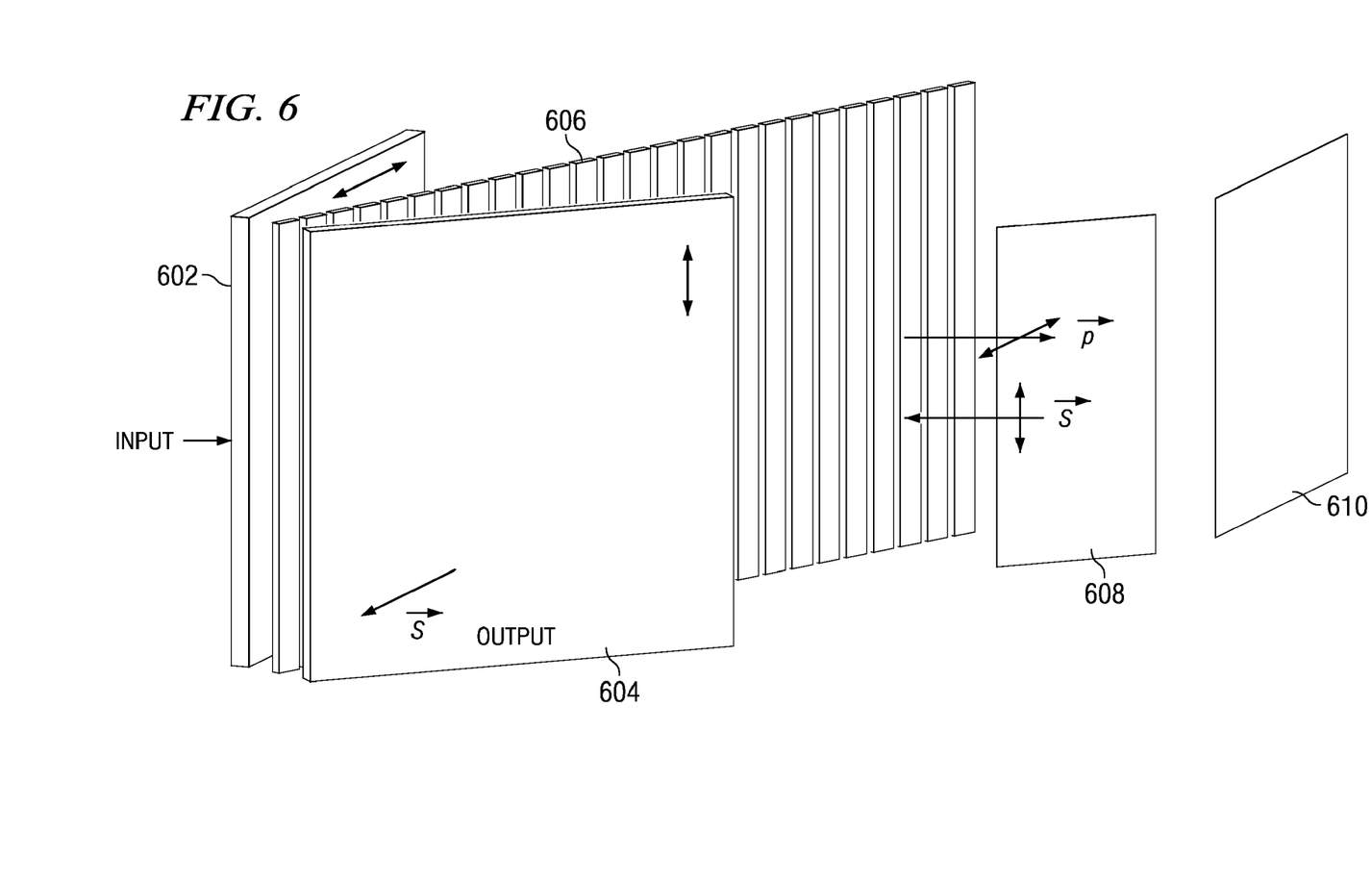
FIG. 6 is a schematic diagram showing the application and positioning of a wire grid polarizer in an exemplary modulation subsystem in accordance with the present disclosure.

FIG. 6 is a perspective schematic diagram showing the application and positioning of a wire grid polarizer in an exemplary modulation subsystem. To achieve high contrast, sheet polarizers 602 and 604 are located on the entrance and exit ports. Exit polarizer 604 may be the absorptive type. Wire grid polarizer 606 may be positioned along the modulated light portion of the light path and operable to direct a first polarization light in a first direction and to direct a second polarization light in a second direction. Of the two input polarization options, geometrical considerations dictate that the wire orientation of wire-grip polarizer 606 should be substantially normal to the system optic axis since the component tends to behave predominantly as an o-type polarizer with its axis along the wires.

The compensator 608 may be tilted about an axis that is substantially parallel to the wires of the wire-grid polarizer. Further, the compensator 608 may be tilted about the axis toward the plane of the wire-grid polarizer 606 such that the angle between the plane of the compensator 608 and the plane of the wire-grid polarizer 606 is substantially reduced. A reflective panel 610 modulates the light, which reflects off the panel 610 toward wire-grid polarizer 606. Since the modulated light is s-polarized, it is reflected by the WGP 606 toward the exit port and sheet polarizer 604.

FIG. 7 is a schematic diagram of an exemplary optical three-panel LCoS projection system using a polarization beam splitter cube. Projection system 700 shows an exemplary MacNeille 3xPBS/x-cube architecture employing tilted PBS cubes. Collimated light from illumination subsystem 702 is directed toward red, green, and blue modulating subsystems 704, 706, 708, respectively. Each of modulating subsystems 704, 706, 708 respectively includes a MacNeille PBS 710, 712, 714, an LCoS panel 722, 724, 726, and a compensator disposed between the LCoS panel and the PBS, with the elements arranged as shown. As previously described with respect to other embodiments, the compensators 716, 718, 720 may be tilted relative to the plane of the respective LCoS panel 722, 724, 726.

With MacNeille PBSs, it is known that geometrical skew ray polarization mixing can effect the contrast performance of projection system. A way of tackling this issue is to locate pre- and/or post-polarizers at the input and output ports of modulating subsystems 704, 706, 708. The presence of the tilted compensators 716, 718, 720 also improves contrast by decreasing these geometrical effects. Accordingly, a suitable $R_{th}$ value of the compensator 716, 718, 720 may be chosen to be substantially matched to the retardance of the respective LCoS panel 722, 724, 726. Additionally, the $R_{th}$ value may be chosen to address the geometrical effects from a MacNeille PBS. A further technique includes using a quarter wave plate in addition to a compensator, the QWP is aligned to the PBS's s-polarization axis.

Although a MacNeille type PBS is shown in this exemplary embodiment, it should be appreciated that this is used for illustration only, and other types of PBS may be used. For instance, a multilayer or a form-birefringent PBS may be substituted for the MacNeille type. However, form-birefringent PBSs generally do not suffer from the geometrical skew ray polarization mixing that MacNeille type PBSs incur. Thus, the $R_{th}$ value of the compensator in embodiments using form-birefringent PBSs may be selected to be substantially matched to the total retardance of the respective LCoS panel 722, 724, 726.

Figures 8A, 8B:
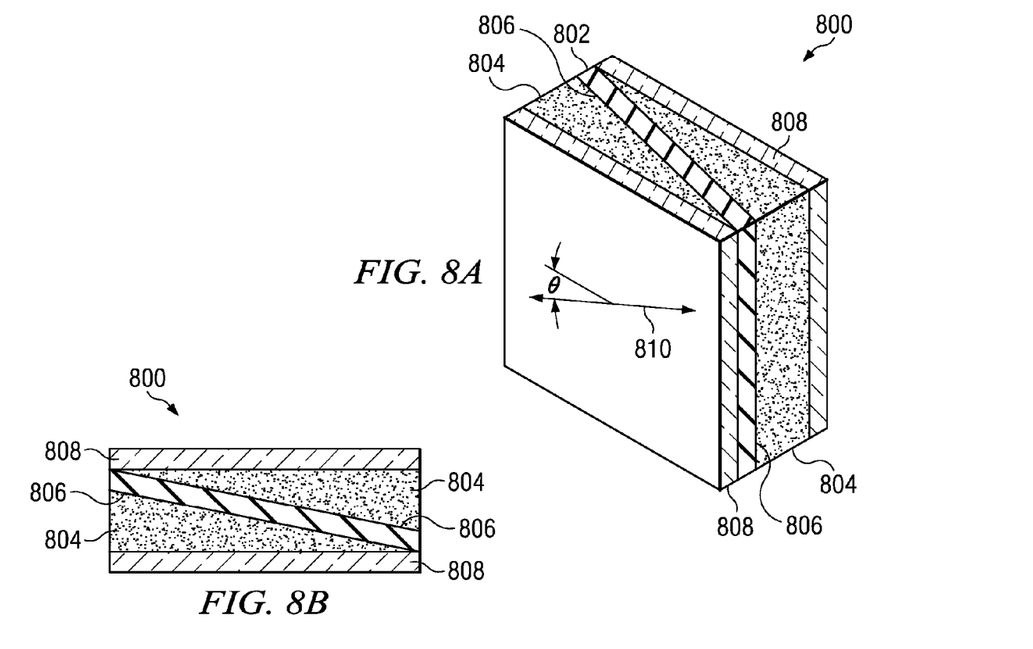
FIG. 8A is a schematic perspective diagram illustrating another exemplary compensator component in accordance with the present disclosure.
FIG. 8B is a schematic diagram illustrating a cross-sectional view of the compensator component shown in FIG. 8A.

FIG. 8A is a schematic perspective diagram illustrating another exemplary compensator component 800. As mentioned above, in cases where any astigmatic aberration is unacceptable, a planar compensator with a tilted optic axis may be used such as a biaxial material 802 sandwiched between oppositely wedged glass substrates 804. Optionally, an anti-reflective coating 808 may be applied to the glass substrates 804. Biaxial material 802 may be bonded to the glass substrates 804 using a conforming index-matched adhesive 806. An exemplary orientation axis for the biaxial material 802 is shown by arrow 810 at θ° relative to the horizontal. Although this embodiment does not significantly reduce the surface reflection contribution to the contrast, it does act to further compensate the wire grid PBS.

FIG. 8B is a schematic diagram illustrating a cross-sectional view of the compensator component 800. This view illustrates that the wedged glass substrates 804 keep the biaxial material 802 at a tilt angle to the surface of compensator component 800. It should thus be appreciated that when compensator compenent 800 is used with projection systems, such as those illustrated in FIGS. 1 and 7, that the plane of the component 800 is parallel to the LC panel, although the plane biaxial material 802 is tilted relative to the plane of the LC panel, and the optic axis of the compensator is also tilted with respect to the LC panel.

It will be appreciated by those of ordinary skill in the art that the teachings herein can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes that come within the meaning and ranges of equivalents thereof are intended to be embraced therein.

Additionally, the section headings herein are provided for consistency with the suggestions under 37 C.F.R. § 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. An optical projection system for projecting modulated light from a liquid crystal (LC) panel along a light path, the projection system comprising:
   a polarizing beam splitter operable to direct a polarized input light along an illumination portion of the light path, the polarizing beam splitter having a light-splitting interface;
   an LC panel positioned in the light path, the LC panel being substantially planar and operable to receive the polarized input light and to modulate the input light to form a modulated light that travels along a modulated light portion of the light path, the LC panel imparting a first polarization upon certain portions of the input light, and the LC panel imparting a second polarization upon other portions of the input light; and
   a compensator positioned along the light path, the compensator being substantially planar, wherein the compensator has an optic axis that is tilted relative to the plane of the LC panel and further wherein the optic axis of the compensator is tilted relative to the light-splitting interface of the polarizing beam splitter.

2. An optical projection system according to claim 1, wherein the optic axis of the compensator lies within its physical plane.

3. An optical projection system according to claim 1, wherein the optic axis of the compensator lies within its physical plane.

4. An optical projection system according to claim 1, wherein the compensator comprises multiple layers of biaxial films.

5. An optical projection system according to claim 1, wherein the polarizing beam splitter is positioned along the modulated light portion of the light path and operable to direct the first polarization light in a first direction and to direct the second polarization light in a second direction.

6. An optical projection system according to claim 5, wherein the compensator is operable to compensate for non-ideal polarization effects imposed by the LC panel and by the polarizing beam splitter.

7. An optical projection system according to claim 1, wherein the compensator is operable to deflect away unwanted reflected light off of the light path.

8. An optical projection system according to claim 1, wherein the polarizing beam splitter is a wire-grid polarizer.

9. An optical projection system according to claim 8, wherein the compensator is tilted about an axis that is substantially parallel to the wires of the wire-grid polarizer.

10. An optical projection system according to claim 9, wherein the compensator is tilted about the axis toward the plane of the wire-grid polarizer such that the angle between the plane of the compensator and the plane of the wire-grid polarizer is substantially reduced.

11. An optical projection system according to claim 1, wherein the polarizing beam splitter is a MacNeille polarizer.

12. An optical projection system according to claim 1, wherein the polarizing beam splitter is a multilayer birefringent cube polarizer.

13. An optical projection system according to claim 1, wherein the LC panel is a reflective panel.

14. An optical projection system according to claim 13, wherein the reflective panel is an LCoS panel.

15. An optical projection system according to claim 14, and further comprising a wire-grid polarizing beam splitter positioned along the modulated light portion of the light path and operable to direct the first polarization light in a first direction and to direct the second polarization light in a second direction.

16. An optical projection system according to claim 1, wherein the LC panel is a transmissive panel.

17. An optical projection system according to claim 1, wherein the biaxial retarder compensator is a uniaxial retarder compensator.

18. An optical projection system according to claim 1, wherein the compensator compensates for dark-state non-ideal polarization effects of the LC panel.

19. An optical projection system according to claim 1, wherein the compensator is oriented to compensate for the in-plane residual panel retardance of the LC panel.

20. An optical projection system according to claim 19, wherein the orientation of the compensator is in the range of three degrees to forty degrees.

21. An optical projection system according to claim 1, wherein an out-of-plane retardance ($R_{th}$) value of the compensator is substantially matched to the retardance of the LC panel.

22. An optical projection system according to claim 1, wherein the optic axis of the compensator is tilted toward the plane of the light-splitting interface such that the angle between the plane of the compensator and the plane of the light-splitting interface is reduced to less than 45 degree.

23. An optical projection system for projecting modulated light from a liquid crystal (LC) panel along a light path, the projection system comprising:
  an LC panel positioned in the light path, the LC panel being substantially planar and operable to receive polarized input light on an illumination portion of the light path and to modulate the input light to form a modulated light that travels along a modulated light portion of the light path, the LC panel imparting a first polarization upon certain portions of the input light, and the LC panel imparting a second polarization upon other portions of the input light; and
  a compensator positioned along the light path, the compensator being substantially planar, the compensator having an optic axis that is tilted relative to the plane of the LC panel; and
  wherein the plane of the LC panel is substantially normal to the light path.

24. An optical projection system for projecting modulated light from a liquid crystal (LC) panel along a light path, the projection system comprising:
  an LC panel positioned in the light path, the LC panel being substantially planar and operable to receive polarized input light on an illumination portion of the light path and to modulate the input light to form a modulated light that travels along a modulated light portion of the light path, the LC panel imparting a first polarization upon certain portions of the input light, and the LC panel imparting a second polarization upon other portions of the input light;
  a compensator positioned along the light path, the compensator being substantially planar, the compensator having an optic axis that is tilted relative to the plane of the LC panel; and
  a polarizing beam splitter positioned along the modulated light portion of the light path and operable to direct the first polarization light in a first direction and to direct the second polarization light in a second direction;
  wherein the polarizing beam splitter is a wire-grid polarizer, and further wherein the compensator is tilted about an axis that is substantially parallel to the wires of the wire-grid polarizer.

25. An optical projection system according to claim 24, wherein the compensator is tilted about the axis toward the plane of the wire-grid polarizer such that the angle between the plane of the compensator and the plane of the wire-grid polarizer is substantially reduced.

* * * * *